US008108236B1

(12) United States Patent
Brearley (10) Patent No.: US 8,108,236 B1
(45) Date of Patent: Jan. 31, 2012

(54) UTILIZING DATE SETS IN MANUFACTURING SYSTEMS

(75) Inventor: Quentin Stewart Brearley, Rancho Palos Verdes, CA (US)

(73) Assignee: Glovia International, Inc., El Segundo, CA (US)

( * ) Notice: Subject to any disclaimer, the term of this patent is extended or adjusted under 35 U.S.C. 154(b) by 1544 days.

(21) Appl. No.: 11/015,725

(22) Filed: Dec. 17, 2004

Related U.S. Application Data

(60) Provisional application No. 60/530,631, filed on Dec. 17, 2003.

(51) Int. Cl.
*G06Q 10/00* (2006.01)
(52) U.S. Cl. ...................................... 705/7.12
(58) Field of Classification Search .................. 705/7.12
See application file for complete search history.

(56) References Cited

U.S. PATENT DOCUMENTS

| | | | | |
|---|---|---|---|---|
| 5,630,070 | A | | 5/1997 | Dietrich et al. ..................... 705/8 |
| 5,787,000 | A | * | 7/1998 | Lilly et al. ......................... 700/95 |
| 5,983,194 | A | * | 11/1999 | Hogge et al. ..................... 705/7.25 |
| 6,141,647 | A | | 10/2000 | Meijer et al. ........................ 705/1 |
| 6,216,109 | B1 | * | 4/2001 | Zweben et al. ..................... 705/8 |
| 6,615,092 | B2 | | 9/2003 | Bickley et al. .................... 700/99 |
| 6,629,008 | B2 | | 9/2003 | Shiiba et al. .................... 700/100 |
| 6,915,275 | B2 | | 7/2005 | Banerjee et al. ................. 705/26 |
| 6,934,594 | B2 | | 8/2005 | Loring et al. .................. 700/100 |
| 2003/0065574 | A1 | * | 4/2003 | Lawrence ......................... 705/26 |
| 2004/0117048 | A1 | | 6/2004 | Wei .................................. 700/100 |
| 2004/0117227 | A1 | | 6/2004 | Wei ...................................... 705/7 |
| 2004/0148212 | A1 | | 7/2004 | Wu et al. ........................... 705/8 |

OTHER PUBLICATIONS

Lambrecht, Marc R., Ivens, Phillip L. and Vandaele, Nico J., A Capacity and Lead Time Integrated Procedure for Scheduling, Nov. 1998, Institute for Operations Research and the Management Sciences, vol. 44, No. 11, Part 1 of 2, pp. 1548-1561.*

Wacker, J.G., Lummus, R.R., "Sales Forecasting for Strategic Resource Planning," International Journal of Operations & Production Management 22, 9/10 (2002) 1014-1031.

* cited by examiner

*Primary Examiner* — Johnna Loftis
*Assistant Examiner* — Brandi P Parker
(74) *Attorney, Agent, or Firm* — Baker Botts L.L.P.

(57) ABSTRACT

A method for utilizing date sets in a manufacturing system includes receiving an order associated with a manufacturing activity, identifying steps involved in the manufacturing activity, and formulating multiple schedules, where each schedule associates the steps with dates. The method also includes selecting one of the schedules for the manufacturing activity.

28 Claims, 3 Drawing Sheets

|  | 66 — RESOURCE RECEIVED AT DOCK | RESOURCE MOVED TO WAREHOUSE | 74 — RESOURCE MOVED TO PRODUCTION LINE | PRODUCT PRODUCTION BEGINS | PRODUCT PRODUCTION ENDS | FINISHED PRODUCT MOVED TO WAREHOUSE | FINISHED PRODUCT SHIPPED |
|---|---|---|---|---|---|---|---|
| REQUESTED DATE | 11/25 | 11/26 | 11/29 | 11/30 | 11/30 | 11/30 | 12/1 |
| PLANNED DATE | N/A | N/A | 11/28 → 11/28 | 11/29 | 11/29 | 11/29 | 11/30 → 11/30 |
| FIRM DATE | N/A | N/A | 11/28 | 11/29 | 11/29 | 11/29 | 11/30 |
| PROMISED DATE | 11/27 | (11/28) — 72 | 11/29 | 11/30 | 12/1 | 12/1 | 12/2 |

UTILIZING DATE SETS IN MANUFACTURING SYSTEMS

RELATED APPLICATION

This application claims priority to U.S. Provisional Patent Application Ser. No. 60/530,631 filed Dec. 17, 2003, entitled Global Business Management.

TECHNICAL FIELD OF THE INVENTION

The present invention relates generally to manufacturing systems, and, more particularly, to utilizing date sets in manufacturing systems.

BACKGROUND OF THE INVENTION

The manufacture of products often includes numerous manufacturing activities, each potentially involving multiple steps. These manufacturing activities and steps may involve one or more local or remote manufacturing facilities.

SUMMARY OF THE INVENTION

In accordance with the present invention, techniques for utilizing date sets in manufacturing systems are provided. According to particular embodiments, these techniques enable one or more manufacturing facilities to plan resource usage according to date sets associated with steps involved in a manufacturing activity.

According to a particular embodiment, a method for utilizing date sets in a manufacturing system includes receiving an order associated with a manufacturing activity, where the order identifies a requested date. The method further includes identifying multiple steps involved in the manufacturing activity and formulating a first schedule at least in part based on the requested date. The first schedule includes multiple first dates, where each first date is associated with a unique one of the steps. The method further includes formulating a second schedule at least in part based on inventory information associated with at least one resource used in the manufacturing activity. The second schedule includes multiple second dates, where each second date is associated with a unique one of the steps. The method also includes formulating a third schedule at least in part based on the second schedule. The third schedule includes multiple third dates, where each third date is associated with a unique one of the steps and at least one third date in the third schedule differs from a corresponding second date in the second schedule by an adjustment. The method also includes selecting one of the first, second, and third schedules for the manufacturing activity.

Embodiments of the invention provide various technical advantages. According to particular embodiments, these techniques may eliminate or reduce inefficiencies and other problems associated with traditional manufacturing systems. For example, these techniques may allow manufacturing systems to utilize date sets to schedule manufacturing activities and plan resource usage. Scheduling and planning may be conducted on a particularly granular level. Sophisticated planning may also be facilitated. According to particular embodiments, utilizing date sets may allow a manufacturing system to optimize resource usage while meeting deadlines. These techniques may also allow a manufacturer to generate schedules to meet customer demand while building in margins to accommodate unforeseen problems that may occur during execution of a schedule. According to particular embodiments, aggressive and conservative schedules may be prepared and selected as appropriate.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which.

DETAILED DESCRIPTION OF THE INVENTION

Figure 1:
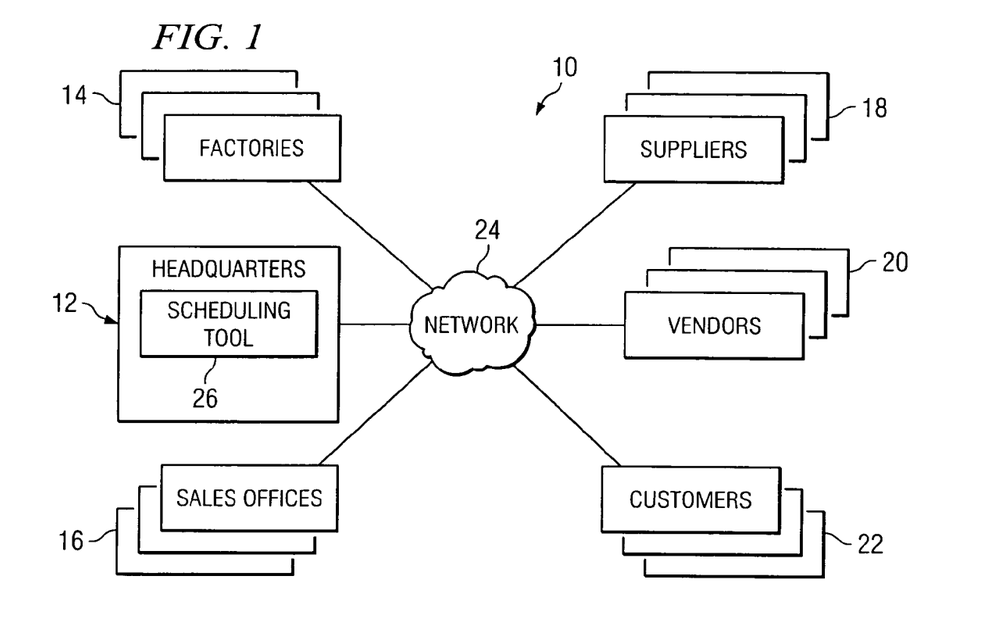
FIG. 1 illustrates a manufacturing system.

FIG. 1 illustrates a manufacturing system, indicated generally at 10, that includes a headquarters 12, factories 14, sales offices 16, suppliers 18, vendors 20, and customers 22 interconnected through a network 24. Headquarters 12 includes a scheduling tool 26 for use in scheduling manufacturing activities in manufacturing system 10. In general, scheduling tool 26 utilizes date sets. In particular, scheduling tool 26 may plan resource usage according to date sets associated with steps involved in a manufacturing activity.

Headquarters 12 represents a centralized business office for managing and planning aspects of manufacturing activities occurring within manufacturing system 10. Factories 14 represent facilities involved in the manufacture of products. Sales offices 16 represent distributed business offices for generating demand for the manufacture of products by factories 14. Suppliers 18 and vendors 20 represent entities that supply resources to factories 14. Customers 22 represent entities requesting products manufactured by factories 14. Headquarters 12, factories 14, sales offices 16, suppliers 18, vendors 20, and customers 22 each include appropriate hardware, software, and controlling logic capable of communicating with other elements of manufacturing system 10 through network 24.

Network 24 represents any suitable collection of hardware, software, and controlling logic capable of interconnecting elements coupled to network 24. In a particular embodiment, network 24 may include one or multiple networks, such as a telecommunications network, a local area network (LAN), a wide area network (WAN), the Internet, and/or any other appropriate networks. Thus, network 24 provides infrastructure to support communications within manufacturing system 10.

Scheduling tool 26 represents any suitable collection of hardware, software, and controlling logic for scheduling manufacturing activities within manufacturing system 10. Thus, according to a particular embodiment, scheduling tool 26 is a software application loaded onto a general purpose computer. Note that while illustrated as being located within headquarters 12, scheduling tool 26 may be utilized in various locations within manufacturing system 10. For example, scheduling tool 26 may be located within a particular factory 14, a particular sales office 16, or any other appropriate location. Furthermore, scheduling tool 26 may be distributed among various elements of manufacturing system 10.

In operation, manufacturing system 10 may utilize various types of orders to identify and/or communicate information related to manufacturing activities. For example, orders utilized by manufacturing system 10 may include work orders, purchase orders, and sales orders. The orders may indicate dates associated with manufacturing activities. For example, a particular order may indicate a requested completion date for a requested manufacturing activity. Alternatively or in addition, an order may indicate a requested shipping date, delivery date, and/or any other appropriate date associated with one or more specific manufacturing activities.

The orders may be communicated between elements of manufacturing system 10 through network 24. For example, orders may be communicated through network 24 using a common protocol such as extensible markup language (XML). Thus, for example, customers 22 may communicate purchase orders through network 24 to headquarters 12 and/or sales offices 16. Similarly, factories 14 may communicate work orders through network 24 to suppliers 18 and/or vendors 20.

Based on a requested manufacturing activity associated with a particular order, scheduling tool 26 may identify various tasks or steps to be completed during the manufacturing activity. Steps may include any action taken to fulfill an order. For example, for a work order associated with production at factories 14, steps might include moving raw materials from a warehouse to a production line, beginning production on the production line using the raw materials, completing production on the production line, and moving completed products to a warehouse. While particular examples of steps involved in a manufacturing activity have just been listed, it should be understood that various steps may be identified depending on a particular manufacturing activity. Furthermore, more or less steps may be identified. In particular, scheduling tool 26 may undertake low level or high level scheduling where low level scheduling may identify more steps when compared to high level scheduling.

Each step identified as involved in a manufacturing activity may be assigned multiple dates by scheduling tool 26. Thus, each step may be assigned a date set. As used herein, a date set represents a group of times associated with a particular step involved in a manufacturing activity. The times may be represented as seconds, minutes, hours, days, months, or a combination of these or any other appropriate time periods. According to particular embodiments, the times may indicate when the step may be initiated or completed.

By assigning multiple dates to each step in a manufacturing activity, the step may be associated with multiple schedules for execution of a manufacturing activity. Various schedules may be formulated by scheduling tool 26. For example, scheduling tool 26 may formulate aggressive or conservative schedules. By identifying multiple schedules, scheduling tool 26 injects flexibility into the scheduling process. Furthermore, scheduling tool 26 may forecast future resource usage using different assumptions and react to these forecasts in various ways. In addition, scheduling tool 26 may use the schedules to schedule other manufacturing activities at appropriate times.

One example of a schedule formulated by scheduling tool 26 is a requested schedule. Scheduling tool 26 may formulate a requested schedule based on the requested date associated with a particular order. The requested schedule may include a date for each step involved in the manufacturing activity, where the manufacturing activity will begin or complete based on the requested date included in the order. For example, a work order may include a requested date that indicates when a manufacturing activity should be completed. Thus, steps identified in the requested schedule for the work order may be assigned dates that would cause the manufacturing activity to be completed by the requested date.

Another type of schedule that scheduling tool 26 may formulate is a planned schedule. Scheduling tool 26 may utilize information regarding resources to formulate a planned schedule for execution of steps in the manufacturing activity. Resources may include raw materials, components, fuel, time, energy, manpower, and/or any other supply used by elements of manufacturing system 10 to manufacture products. Relevant information used by scheduling 26 may include capacities of manufacturing tools such as production lines and inventories of resources such as raw materials. Projected inventory may be identified in various ways, such as by using purchase orders, on-hand inventory, and work orders for finished bids. Furthermore, various planning algorithms may optimize use of the resources. For example, scheduling tool 26 may identify other scheduled uses of resources used in the requested manufacturing activity and plan accordingly.

A firm schedule is another type of schedule that scheduling tool 26 may formulate. A firm schedule is a schedule that has been approved in one way or another. One way of creating a firm schedule is for scheduling tool 26 to compare a requested schedule with a planned schedule to determine whether the planned schedule is acceptable. According to a particular embodiment, if a difference between a requested schedule and a planned schedule falls within a predetermined tolerance, the planned schedule may be automatically accepted. On the other hand, if the difference falls outside a predetermined tolerance, the planned schedule may be presented to a user of scheduling tool 26 for intervention. The user may or may not modify the planned schedule. Once the user is satisfied with the modified or unmodified planned schedule, the user may cause scheduling tool 26 to use the modified or unmodified planned schedule as a firm schedule. Thus, according to a particular embodiment, the firm schedule may be a planned schedule that has been authorized automatically based on a comparison with a requested schedule or that has been authorized by a user of scheduling tool 26.

Note that tolerances may be determined by scheduling tool 26 in various, ways. Scheduling tool 26 may store tolerances for customers 22. For example, scheduling tool 26 may access customer information associated with an order and base a decision on the acceptability of a planned schedule based on the customer information. The customer information may identify preferences of customers and/or tolerances associated with customers. For example, scheduling tool 26 may allow greater or smaller differences between requested completion dates and planned completion dates for particular customers.

Scheduling tool 26 may also generate a promised schedule. Promised schedules may incorporate conservative adjustments to one or more dates. For example, a delivery date to a customer may be later in a promised schedule when compared to a firm schedule to include a margin for error. The margin for error may protect factories 14 in case unforeseen problems that may arise. Unforeseen problems may include manufacturing tools breaking, production lines going down, last minute changes to work orders, and similar circumstances. According to particular embodiments, promised schedules may be communicated to customers 22 through network 24.

Thus, at least four types of schedules may be formulated for a particular manufacturing activity. A requested schedule reflects a requested date communicated by customer 22. A planned schedule reflects an ability of manufacturing system 10 to manufacture a product based on inventories and capabilities of resources. A firm schedule represents an acceptable schedule that may reflect both the requested date and the inventory and capacity of resources. A promised schedule represents a schedule that includes margins for error. While specific examples of schedules have been discussed, note that other schedules may be formulated as appropriate.

Schedules may be relatively aggressive or conservative. For example, an aggressive schedule may include tightly packed dates with relatively less margins for error between steps. A conservative schedule may space dates apart so as to include relatively larger margins for error between steps. Thus, scheduling tool 26 may formulate aggressive and/or conservative schedules as appropriate. Furthermore, note that a promised schedule may be generally more conservative than a planned schedule or a firm schedule due to margins for error include in the promised schedule. Thus, scheduling tool 26 may select a particular schedule based on the aggressive or conservative nature of the schedule for planning purposes. In addition, note that utilizing schedules that include larger buffers may act as an expense in the manufacturing process. Resources and products that must be stored take up space in warehouses. However, these buffers may prevent missing deadlines. Thus, scheduling tool 26 may optimize schedules by adjusting buffers to an appropriate level to reduce expense associated with storage of resources and products.

Scheduling tool 26 may utilize different schedules for different purposes. As mentioned above, scheduling tool 26 may formulate or select an aggressive or conservative schedule. For example, for an order associated with a manufacturing activity controlled by factory 14, factory 14 may utilize a schedule that is more aggressive. Because factory 14 can control the manufacturing process, the aggressive schedule may be more appropriate for planning purposes. On the other hand, for an order associated with a manufacturing activity controlled by supplier 18, factory 14 may utilize a schedule that is more conservative. Because factory 14 cannot control the manufacturing process, the conservative schedule may be more appropriate for planning purposes.

Note that products to be manufactured may include multiple components and/or may involve multiple manufacturing resources. Scheduling tool 26 may formulate schedules for manufacturing activities associated with each component. These schedules may be interrelated due to the use of each component in the production of the product. Furthermore, note that manufacturing activities may involve one or more elements of manufacturing system 10. For example, raw materials may be ordered from suppliers 18 for use by factories 14 in production of a product.

This interdependency of schedules and elements within manufacturing system 10 creates a closed-loop system that allows scheduling tool 26 to optimize resource usage using planning algorithms. For example, delays associated with receiving a raw material from a particular supplier 18 may cause a delay in using the raw material to produce a component at a particular factory 14. The delay in producing the component at the particular factory 14 may cause a delay in producing an assembled product at another factory 14. Scheduling tool 26 may account for these and other similar changed circumstances and update schedules appropriately. According to a particular embodiment, scheduling tool 26 may switch from using one type of schedule to another upon receiving notice of changed circumstances. For each step in a manufacturing activity, a different date from the date set associated with that step may then be utilized for planning purposes.

Thus, scheduling tool 26 may utilize date sets to schedule manufacturing activities and plan resource usage within manufacturing system 10. Various schedules may be formulated and selected based upon various factors. Aggressive and conservative schedules may be selected by scheduling tool 26 as appropriate.

Figure 2:
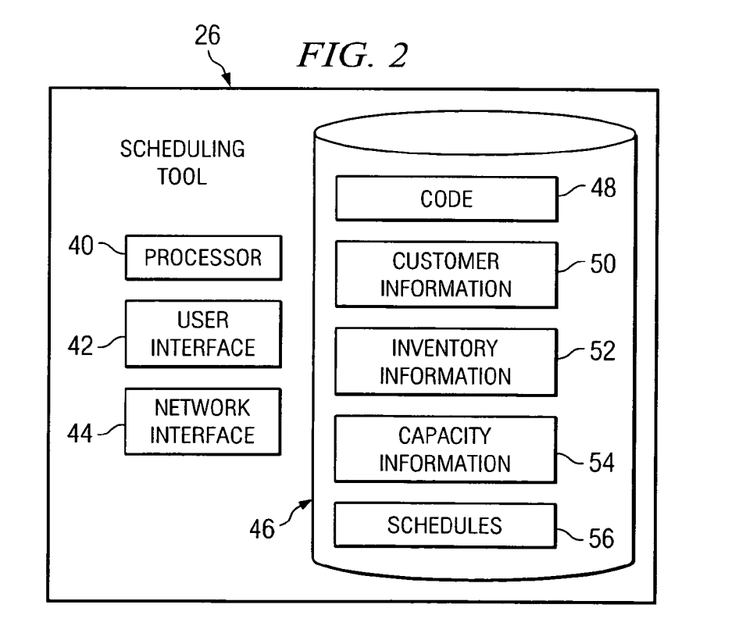
FIG. 2 illustrates functional components of a scheduling tool that utilizes date sets in a manufacturing system.

FIG. 2 is a block diagram illustrating exemplary functional components of scheduling tool 26. In the embodiment illustrated, scheduling tool 26 includes a processor 40, a user interface 42, a network interface 44, and a memory 46. These functional components can operate to utilize date sets in manufacturing system 10.

Processor 40 represents any hardware and/or logic elements operable to control and process information. Processor 40 controls the operation and administration of elements within scheduling tool 26. For example, processor 40 operates to process information received from user interface 42, network interface 44, and memory 46. Thus, processor 40 may be a programmable logic device, a controller, and/or any other suitable processing device.

User interface 42 represents hardware and/or software for inputting information into scheduling tool 26 and outputting information from scheduling tool 26. For example, user interface 42 may receive input such as information regarding inventories of resources and capacities of manufacturing tools from a user of scheduling tool 26. User interface 42 may also display this and other information such as manufacturing schedules to a user of scheduling tool 26. Thus, user interface 42 may include hardware components such as keyboard, mouse, display, and/or other appropriate devices as well as associated software for inputting and outputting information.

Network interface 44 represents hardware and/or software operable to communicate information to and receive information from devices coupled to scheduling tool 26. For example, network interface 44 may communicate with headquarters 12, factories 14, sales offices 16, suppliers 18, vendors 20, and customers 22. Thus, network interface 44 includes any suitable hardware or controlling logic to communicate information to or from elements coupled to scheduling tool 26.

Memory 46 represents any one or a combination of volatile or non-volatile local or remote devices suitable for storing information. Memory 46 stores, either permanently or temporarily, data or other information for processing by processor 40 and communicating using user interface 42 and/or network interface 44. For example, memory 46 may include random access memory (RAM), read only memory (ROM), magnetic storage devices, optical storage devices, or any other suitable information storage device or a combination of these devices. As illustrated, memory 46 may include one or more memory modules.

Code 48 includes software, executable files, and/or appropriate logic modules capable when executed to control the operation of scheduling tool 26. For example, code 48 may include executable files capable of processing orders and formulating schedules for manufacturing activities. Customer information 50 stores information relevant to particular customers. For example, customer information 50 may indicate on a customer-by-customer basis tolerances for deviations from requested dates associated with orders. Inventory information 52 stores information identifying inventories of resources used in manufacturing processes. For example, inventory information 52 may include amounts of raw materials available for use in manufacturing activities. Capacity information 54 stores information identifying capacities of manufacturing tools used in manufacturing processes. For example, capacity information 54 may include numbers of products able to be assembled per hour on particular production lines.

In operation, scheduling tool 26 formulates schedules for manufacturing activities in manufacturing system 10. Scheduling tool 26 may receive and process orders, identify steps in manufacturing activities, and formulate schedules based on relevant information. Furthermore, scheduling tool 26 may plan resource usage within manufacturing system 10 and/or a particular facility within manufacturing system 10.

Information may be communicated to scheduling tool 26 through user interface 42 and/or network interface 44. For example, orders may be received from a user of scheduling tool 26 through user interface 42 and/or from remote elements of manufacturing system 10 through network interface 44. Similarly, customer information 50, inventory information 52, and capacity information 54 may be inputted into memory 46 through user interface 42 and/or network interface 44.

Processor 40 may execute code 48 to perform various processes. For example, processor 40 may execute code 48 to analyze received orders to identify requested dates associated with requested manufacturing activities. Processor 40 may also execute code 48 to identify steps associated with manufacturing activities. In addition, processor 40 may execute code 48 to formulate multiple schedules 56 for manufacturing activities.

Various schedules 56 may be formulated by processor 40 for a particular manufacturing activity. According to a particular embodiment, processor 40 may formulate a requested schedule based on a date included in a received order. For example, dates may be assigned to steps involved in the manufacturing activity such that the manufacturing activity is begun after an identified start date. Alternatively or in addition, dates may be assigned to steps involved in the manufacturing activity such that the manufacturing activity is completed before an identified completion date. When appropriate, processor 40 may also formulate a planned schedule. For example, code 48 may utilize one or more planning algorithms to generate a planned schedule based on inventory information 52 and capacity information 54 for manufacturing activities utilizing resources. According to a particular embodiment, the planned schedule may optimize usage of raw materials, components, production lines, and/or other resources based on inventory information 52 and capacity information 54. Thus, planned schedules may be coordinated with preexisting schedules as appropriate. Furthermore, planned schedules may be more or less aggressive or conservative based on various factors, such as customer information 50 associated with a received order. Processor 40 may also formulate a firm schedule when appropriate. For example, a planned schedule may be compared to a requested schedule to determine whether the planned schedule should be adopted as the firm schedule. When there are little or no differences, the planned schedule may be adopted as the firm schedule.

According to a particular embodiment, processor 40 accesses customer information 50 to identify one or more predetermined tolerances for differences between the requested schedule and the planned schedule for a particular customer. Processor 40 may compare any differences with the predetermined tolerance. Based on the comparison, processor 40 may determine to create a firm schedule. If the difference falls within the predetermined tolerance, processor 40 may use the dates in the planned schedule as the dates within the firm schedule. Alternatively, if the difference falls outside the predetermined tolerance, the planned schedule may be presented to a user of scheduling tool 26. The user may use user interface 42 to modify the planned schedule as appropriate. For example, the user may modify one or more dates within the planned schedule and then indicate that the modifications to the planned schedule make the planned schedule appropriate for use as the firm schedule. Alternatively or in addition, the user may indicate that the planned schedule is authorized for use as the firm schedule without modification.

Processor 40 and/or a user of scheduling tool 26 may also modify the firm schedule to formulate a promised schedule. For example, one or more buffers may be inserted into the firm schedule to allow for delays that may occur due to changed circumstances. Changed circumstances might include, for example, broken down production lines or a rushed order being received at a later time and scheduled to use resources that otherwise would have been available. The promised schedule may be communicated to a customer 22 using network interface 44. Various other schedules may also be formulated by processor 40.

By formulating multiple schedules, each step involved in a particular manufacturing activity may be assigned multiple dates. Processor 40 may execute code 48 to analyze schedules 56 and/or date sets for particular steps. For example, resource usage may be forecasted and inventory information 52 may be updated. Furthermore, a newly generated schedule 56 may be compared with stored schedules 56 in memory 46 to coordinate activities. Processor 40 may select one of schedules 56 for various reasons. For aggressive forecasting, schedules without buffers may be selected. According to a particular embodiment, an aggressive schedule may be a firm schedule. Therefore processor 40 may select firm schedules for aggressive forecasting. For conservative forecasting, schedules with buffers may be selected. According to a particular embodiment, a conservative schedule may be a promised schedule. Therefore processor 40 may select promised schedules for conservative forecasting.

Processor 40 may bundle multiple dates into one or more types of data structures stored in memory 46. The dates may be organized in various fashions. According to a particular embodiment, the data structures may organize dates by steps, manufacturing activities, and/or any other logical parameter or combination of parameters. For example, processor 40 may store date sets in separate data structures. Alternatively or in addition, processor 40 may bundle multiple dates sets for a common manufacturing activity into one data structure. Furthermore, each date within a data structure may be usable for different purposes. For example, when processor 40 schedules for a resource to be shipped from a first element of manufacturing system 10 to a second element of manufacturing system 10, processor 40 may utilize an earlier requested shipping date for scheduling shipment from the first element when compared to a promise date used to schedule receipt of the resource at the second element.

Thus, the elements of scheduling tool 26 may operate to schedule manufacturing activities in manufacturing system 10. Furthermore, scheduling tool 26 may utilize date sets to plan resource usage.

While this example includes specific functional components for scheduling tool 26, scheduling tool 26 may include any collection and arrangement of components, including some or all of the enumerated functional components, for scheduling manufacturing activities in manufacturing system 10. Moreover, scheduling tool 26 contemplates implementing each of the functional components using any suitable combination and arrangement of hardware and/or logic, and implementing any of the functionalities using a computer program stored on a computer readable medium. Furthermore, scheduling tool 26 may be implemented as a stand-alone device, or aspects of scheduling tool 26 may be distributed among various devices.

Figure 3:
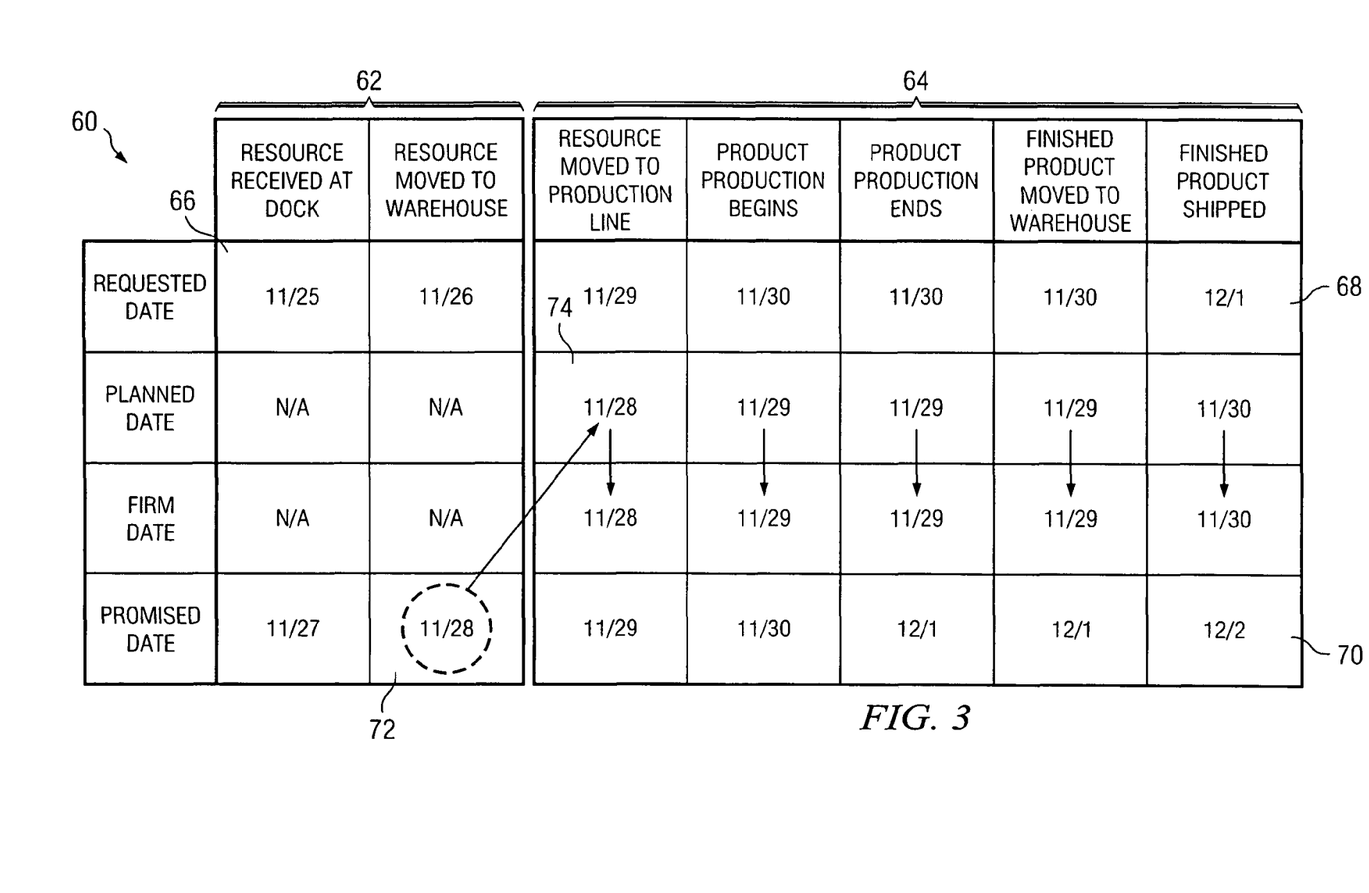
FIG. 3 is a chart illustrating date sets associated with steps in manufacturing activities.

FIG. 3 illustrates a chart 60 that identifies date sets for steps in two related manufacturing activities at a particular factory 14. Each row represents a separate schedule for execution of steps involved in a manufacturing activity, and each column represents a date set for a particular step. According to a particular embodiment, chart 60 may be created and stored by scheduling tool 26.

Scheduling tool 26 may identify the two manufacturing activities after receiving orders through network 24 or through user interface 42. Note that the manufacturing activities are related because the resource received will be used in the production of a finished product for a particular customer 22. The first manufacturing activity is associated with a purchase order and involves ordering a resource from a particular supplier 18. Scheduling tool 26 has identified at least two steps as being associated with the purchase order: receiving the ordered resource at a dock and moving the resource to a warehouse. These steps are illustrated in columns 62. The second manufacturing activity is associated with a work order and involves using the ordered resource to produce a finished product. Scheduling tool 26 has identified multiple steps as being associated with the work order: moving a resource to a production line, beginning production of the product using the resource, finishing production of the product, moving the finished product to a warehouse, and shipping the finished product. These steps are illustrated in columns 64.

For each manufacturing activity, scheduling tool 26 identifies a requested date. For the purchase order, the requested date may be a date factory 14 requested the resource be delivered. In this case, the requested date may be identified in cell 66 of chart 60 as being associated with the step of receiving the resource at a dock. Thus, as illustrated, this requested date may be November 25. For the work order, the requested date may be a date customer 22 requested factory 14 to ship the finished product. In this case, the requested date may be identified in cell 68 of chart 60 as being associated with the step of shipping the finished product. Thus, as illustrated, this requested date may be December 1. Note that factory 14 may have entered the requested date of November 25 into the purchase order based on receipt of the work order with a requested shipping date for the ordered product of December 1. Furthermore, the decision to use November 25 may be based on identification of one or more of the schedules illustrated in chart 60.

Based on the requested dates, scheduling tool 26 may create requested schedules for each manufacturing activity and therefore requested dates for each step in the two manufacturing activities. Note that requested dates may be formulated backwards or forwards in time. For example, for the purchase order the dates may be formulated in a forward manner. On the other hand, for the work order the steps may be formulated in a backwards manner.

Additional schedules may be formulated by scheduling tool 26. For example, as illustrated scheduling tool 26 has formulated a promised schedule for the purchase order. Factory 14 may have requested that the resource be delivered to the dock on November 25, and this date may be used as the requested date. However, scheduling tool 26 may use a later promised date of November 27 to allow for unforeseen delays causing supplier 18 to deliver the resource to factory 14 as late as November 27. Similarly, for the step of moving the resource to the warehouse, a requested date of November 26 is indicated and a promised date of November 28 is indicated to allow for two days of unforeseen delays. Thus, cell 72 indicates a conservative promised date of November 28 for movement of the resource from the shipping dock to the warehouse. Note that no planned dates or firm dates are indicated for the purchase order. Scheduling tool 26 may not formulate planned dates or firm dates for various reasons. For example, scheduling tool 26 may not formulate a planned schedule or a firm schedule if factory 14 does not anticipate the steps in the manufacturing activity being affected by resource usage within factory 14.

As illustrated, scheduling tool 26 generates a planned schedule for the work order. Scheduling tool 26 may utilize planning algorithms to analyze inventory information 52 and capacity information 54 to generate planned dates for the steps associated with the work order. For example, a planning algorithm may determine a date resources such as raw materials will be available to be moved to a production line as indicated by the first step in the manufacturing activity. The planning algorithm may utilize conservative or aggressive dates. When a conservative date is used, as illustrated, the date in cell 72 may be the same as the date in cell 74. Thus, the interrelationship between the two manufacturing activities may be used as a feedback loop by scheduling tool 26 to optimize usage of resources. Based on the date for the first step, each other step may be assigned a date to complete the planned schedule. The dates formulated for the other steps may be aggressive or conservative. For example, aggressive dates would generally create a more compact schedule while conservative dates would generally create a less compact schedule.

Scheduling tool 26 also generates a firm schedule for the work order. To formulate the firm schedule, scheduling tool 26 may compare the requested dates and the planned dates to determine any differences. These differences may be analyzed by scheduling tool 26 to determine whether the differences fall within a predetermined tolerance. According to a particular embodiment, the predetermined tolerance may be associated with the particular customer 22 associated with work order. In the embodiment illustrated, the planned dates fall within the predetermined tolerance and therefore are used by scheduling tool 26 as firm dates. Note that if the difference between the requested dates and the planned dates do not fall within the predetermined tolerance, the planned dates may be presented to a user of scheduling tool 26. The user may adjust one or more of the planned dates as appropriate before authorizing firm dates. Alternatively, the user may simply authorize the planned dates without modification.

In addition, scheduling tool 26 formulates a promised schedule for the work order. As illustrated, scheduling tool 26 has added margins to the firm dates to allow factory 14 some margin for error in using the resource to produce the finished product. Scheduling tool 26 may communicate one or more of the promised dates to customer 22. Thus, scheduling tool 26 may communicate the date in cell 70 to customer 22 to identify that factory 14 plans to ship the finished product to customer 22 by December 2.

While chart 60 illustrates multiple schedules associated with these two related manufacturing activities, various numbers and types of schedules may be formulated for planning purposes. Furthermore, scheduling tool 26 may select one or more of the schedules identified in chart 60 for planning purposes. For example, for conservative planning the promised schedule and therefore the promised dates associated with the work order may be selected. For more aggressive planning, the planned schedule and therefore the planned dates associated with the work order may be selected.

Thus, chart 60 illustrates date sets associated with steps involved in two manufacturing activities. Scheduling tool 26 may formulate and utilize the date sets as appropriate for planning resource usage within one or more facilities in manufacturing system 10.

Note that while illustrated as including particular dates, alternatively or in addition each date set may include particular times. Furthermore, increased granularity may be achieved by creating schedules and date sets associated with particular components and/or resources associated with particular manufacturing activities.

Figure 4:
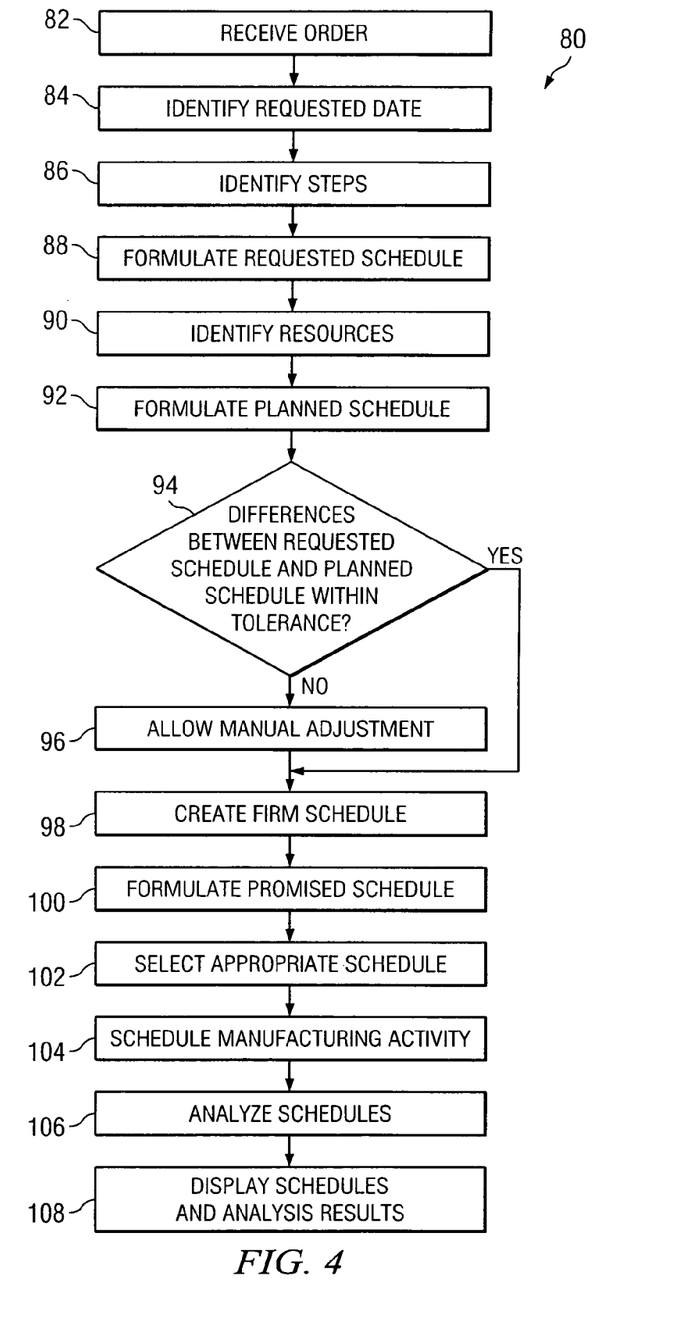
FIG. 4 is a flowchart illustrating a method of utilizing date sets in a manufacturing system.

FIG. 4 is a flowchart illustrating a method 80 for utilizing date sets in manufacturing system 10. Scheduling tool 26 receives an order associated with a manufacturing activity at step 82. Scheduling tool 26 analyzes the received order and identifies a requested date at step 84. For example, the requested date may be specified in the received order as a requested completion date for the manufacturing activity. Scheduling tool 26 may identify multiple steps involved in the manufacturing activity associated with the received order at step 86. Note that scheduling tool 26 may identify steps for various components and/or resources associated with the manufacturing activity.

At step 88, scheduling tool 26 formulates a requested schedule for the manufacturing activity. The requested schedule may be based on the requested date. Scheduling tool 26 may identify resources associated with the manufacturing activity at step 90. Based on inventory information and/or capacity information associated with the identified resources, scheduling tool 26 may formulate a planned schedule for execution of the steps involved in the manufacturing activity at step 92. The planned schedule may reflect various factors such as availabilities of resources and capacities of manufacturing tools.

Scheduling tool 26 may determine whether any differences between the dates in the requested schedule and the planned schedule fall within a predetermined tolerance at step 94. The predetermined tolerance may be associated with the customer identified in the received order. If the differences do not fall within the predetermined tolerance, scheduling tool 26 may present the planned schedule to a user for manual adjustment at step 96 before creating the firm schedule at step 98. For example, one or more dates in the planned schedule may be manually adjusted before the firm schedule is created. However, alternatively, the user may allow the planned schedule to become the firm schedule without modification. If the differences do fall within the predetermined tolerance, scheduling tool 26 uses the planned dates as the firm dates when creating the firm schedule at step 98.

Scheduling tool 26 may formulate a promised schedule at step 100. According to particular embodiments, the promised schedule may incorporate margins to account for unforeseen errors and/or circumstances that may delay completion of the manufacturing activity and/or particular steps in the manufacturing activity.

Planning tool 26 selects an appropriate schedule at step 102. Different schedules may be appropriate at different times and for different purposes. For example, for aggressive scheduling firm schedules may be selected. For conservative scheduling, promised schedules may be selected. Using the selected schedule, scheduling tool 26 may schedule actual manufacturing activity at step 104. At step 106, scheduling tool 26 may analyze the selected schedule to optimize and/or create coordinated schedules. Furthermore, scheduling tool 26 may display schedules and analysis results to a user of scheduling tool 26 at step 108.

Thus, method 100 illustrates utilizing date sets in manufacturing system 10. Each step in a manufacturing activity may be associated with multiple dates, and particular dates may be selected for scheduling and planning purposes.

The preceding flowchart illustrates a particular method that utilizes date sets in manufacturing system 10. However, this flowchart illustrates only an exemplary method of operation, and the present invention contemplates any suitable techniques, elements, and applications for performing these functions. Thus, many of the steps in the flowchart may take place simultaneously and/or in different orders than as shown. In addition, methods may include additional steps or fewer steps, so long as the methods remain appropriate. Moreover, one or more elements of manufacturing system 10 may work independently and/or in conjunction with other elements to utilize date sets in manufacturing system 10 and/or particular facilities within manufacturing system 10.

Although the present invention has been described in several embodiments, a myriad of changes or modifications may be suggested to one skilled in the art, and it is intended that the present invention encompass such changes and modifications as fall within the present appended claims.

What is claimed is:

1. A method for utilizing date sets in a manufacturing system, comprising:
   receiving an order associated with a manufacturing activity, the order identifying a requested date;
   identifying a plurality of steps involved in the manufacturing activity;
   formulating by a processor a first schedule at least in part based on the requested date, the first schedule including a plurality of first dates, wherein each first date is associated with a unique one of the steps;
   formulating by the processor a second schedule at least in part based on inventory information associated with at least one resource used in the manufacturing activity, the second schedule including a plurality of second dates, wherein each second date is associated with a unique one of the steps;
   formulating by the processor a third schedule at least in part based on the second schedule, the third schedule including a plurality of third dates, wherein each third date is associated with a unique one of the steps and at least one third date in the third schedule differs from a corresponding second date in the second schedule by an adjustment;
   selecting by the processor one of the first, second, and third schedules for the manufacturing activity;
   identifying a second manufacturing activity affected by the selected schedule;
   identifying a plurality of second steps involved in the second manufacturing activity; and
   formulating a coordinated schedule at least in part based on the selected schedule, the coordinated schedule including a plurality of coordinated dates, wherein each coordinated date is associated with a unique one of the second steps.

2. The method of claim 1, further comprising:
   scheduling the manufacturing activity based on the selected schedule; and
   indicating resource usage in a manufacturing system based on the selected schedule and a plurality of other schedules associated with other manufacturing activities.

3. The method of claim 1, further comprising:
   determining a difference between the first schedule and the second schedule; and
   scheduling the manufacturing activity according to the second schedule if the difference falls within a predetermined tolerance.

4. The method of claim 1, further comprising:
   determining a difference between the first schedule and the second schedule; and
   if the difference does not fall within a predetermined tolerance:
      presenting the second schedule to a user;
      receiving a modification to the second schedule from the user; and
      scheduling the manufacturing activity according to the modified second schedule after receiving the modification.

5. The method of claim 1, wherein formulating the second schedule at least in part based on inventory information associated with at least one resource used in the manufacturing activity comprises:
   determining whether to formulate an aggressive schedule or a conservative schedule; and
   in response to determining to formulate the aggressive schedule, selecting second dates such that the aggressive schedule includes relatively short periods of time between the steps when compared to the conservative schedule.

6. The method of claim 1, wherein formulating the second schedule at least in part based on inventory information associated with at least one resource used in the manufacturing activity comprises:
   determining whether to formulate an aggressive schedule or a conservative schedule; and
   in response to determining to formulate the conservative schedule, selecting second dates such that the conservative schedule includes relatively long periods of time between the steps when compared to the aggressive schedule.

7. The method of claim 1, wherein the requested date, the first dates, the second dates, and the third dates indicate particular times of particular days.

8. A device for utilizing date sets in a manufacturing system, comprising:
   an interface coupled to a network operable to receive an order associated with a manufacturing activity, the order identifying a requested date; and
   a processor operable to couple to the interface, to identify a plurality of steps involved in the manufacturing activity, to formulate a first schedule at least in part based on the requested date, the first schedule including a plurality of first dates, wherein each first date is associated with a unique one of the steps, to formulate a second schedule at least in part based on inventory information associated with at least one resource used in the manufacturing activity, the second schedule including a plurality of second dates, wherein each second date is associated with a unique one of the steps, to formulate a third schedule at least in part based on the second schedule, the third schedule including a plurality of third dates, wherein each third date is associated with a unique one of the steps and at least one third date in the third schedule differs from a corresponding second date in the second schedule by an adjustment, to select one of the first, second, and third schedules for the manufacturing activity, to identify a second manufacturing activity affected by the selected schedule, to identify a plurality of second steps involved in the second manufacturing activity, and to formulate a coordinated schedule at least in part based on the selected schedule, the coordinated schedule including a plurality of coordinated dates, wherein each coordinated date is associated with a unique one of the second steps.

9. The device of claim 8, the processor further operable to schedule the manufacturing activity based on the selected schedule and to indicate resource usage in a manufacturing system based on the selected schedule and a plurality of other schedules associated with other manufacturing activities.

10. The device of claim 8, the processor further operable to determine a difference between the first schedule and the second schedule and to schedule the manufacturing activity according to the second schedule if the difference falls within a predetermined tolerance.

11. The device of claim 8, the processor further operable to determine a difference between the first schedule and the second schedule and, if the difference does not fall within a predetermined tolerance, to present the second schedule to a user, to receive a modification to the second schedule from the user, and to schedule the manufacturing activity according to the modified second schedule after receiving the modification.

12. The device of claim 8, wherein formulating the second schedule at least in part based on inventory information associated with at least one resource used in the manufacturing activity comprises:
   determining whether to formulate an aggressive schedule or a conservative schedule; and
   in response to determining to formulate the aggressive schedule, selecting second dates such that the aggressive schedule includes relatively short periods of time between the steps when compared to the conservative schedule.

13. The device of claim 8, wherein formulating the second schedule at least in part based on inventory information associated with at least one resource used in the manufacturing activity comprises:
   determining whether to formulate an aggressive schedule or a conservative schedule; and
   in response to determining to formulate the conservative schedule, selecting second dates such that the conservative schedule includes relatively long periods of time between the steps when compared to the aggressive schedule.

14. The device of claim 8, wherein the requested date, the first dates, the second dates, and the third dates indicate particular times of particular days.

15. Logic for utilizing date sets in a manufacturing system, the logic encoded in a computer readable storage media and operable when executed by a processor to:
   receive an order associated with a manufacturing activity, the order identifying a requested date;
   identify a plurality of steps involved in the manufacturing activity;
   formulate a first schedule at least in part based on the requested date, the first schedule including a plurality of first dates, wherein each first date is associated with a unique one of the steps;
   formulate a second schedule at least in part based on inventory information associated with at least one resource used in the manufacturing activity, the second schedule including a plurality of second dates, wherein each second date is associated with a unique one of the steps;
   formulate a third schedule at least in part based on the second schedule, the third schedule including a plurality of third dates, wherein each third date is associated with a unique one of the steps and at least one third date in the third schedule differs from a corresponding second date in the second schedule by an adjustment;
   select one of the first, second, and third schedules for the manufacturing activity;

identify a second manufacturing activity affected by the selected schedule;
identify a plurality of second steps involved in the second manufacturing activity; and
formulate a coordinated schedule at least in part based on the selected schedule, the coordinated schedule including a plurality of coordinated dates, wherein each coordinated date is associated with a unique one of the second steps.

16. The logic of claim 15, further operable when executed to:
schedule the manufacturing activity based on the selected schedule; and
indicate resource usage in a manufacturing system based on the selected schedule and a plurality of other schedules associated with other manufacturing activities.

17. The logic of claim 15, further operable when executed to:
determine a difference between the first schedule and the second schedule; and
schedule the manufacturing activity according to the second schedule if the difference falls within a predetermined tolerance.

18. The logic of claim 15, further operable when executed to:
determine a difference between the first schedule and the second schedule; and
if the difference does not fall within a predetermined tolerance:
present the second schedule to a user;
receive a modification to the second schedule from the user; and
schedule the manufacturing activity according to the modified second schedule after receiving the modification.

19. The logic of claim 15, wherein formulating the second schedule at least in part based on inventory information associated with at least one resource used in the manufacturing activity comprises:
determining whether to formulate an aggressive schedule or a conservative schedule; and
in response to determining to formulate the aggressive schedule, selecting second dates such that the aggressive schedule includes relatively short periods of time between the steps when compared to the conservative schedule.

20. The logic of claim 15, wherein formulating the second schedule at least in part based on inventory information associated with at least one resource used in the manufacturing activity comprises:
determining whether to formulate an aggressive schedule or a conservative schedule; and
in response to determining to formulate the conservative schedule, selecting second dates such that the conservative schedule includes relatively long periods of time between the steps when compared to the aggressive schedule.

21. The logic of claim 15, wherein the requested date, the first dates, the second dates, and the third dates indicate particular times of particular days.

22. A device for utilizing date sets in a manufacturing system, comprising:
means for receiving an order associated with a manufacturing activity, the order identifying a requested date;
means for identifying a plurality of steps involved in the manufacturing activity;
means for formulating a first schedule at least in part based on the requested date, the first schedule including a plurality of first dates, wherein each first date is associated with a unique one of the steps;
means for formulating a second schedule at least in part based on inventory information associated with at least one resource used in the manufacturing activity, the second schedule including a plurality of second dates, wherein each second date is associated with a unique one of the steps;
means for formulating a third schedule at least in part based on the second schedule, the third schedule including a plurality of third dates, wherein each third date is associated with a unique one of the steps and at least one third date in the third schedule differs from a corresponding second date in the second schedule by an adjustment;
means for selecting one of the first, second, and third schedules for the manufacturing activity;
means for identifying a second manufacturing activity affected by the selected schedule;
means for identifying a plurality of second steps involved in the second manufacturing activity; and
means for formulating a coordinated schedule at least in part based on the selected schedule, the coordinated schedule including a plurality of coordinated dates, wherein each coordinated date is associated with a unique one of the second steps.

23. The device of claim 22 further comprising:
means for scheduling the manufacturing activity based on the selected schedule; and
means for indicating resource usage in a manufacturing system based on the selected schedule and a plurality of other schedules associated with other manufacturing activities.

24. The device of claim 22 further comprising:
means for determining a difference between the first schedule and the second schedule; and
means for scheduling the manufacturing activity according to the second schedule if the difference falls within a predetermined tolerance.

25. The device of claim 22 further comprising:
means for determining a difference between the first schedule and the second schedule; and
if the difference does not fall within a predetermined tolerance:
means for presenting the second schedule to a user;
means for receiving a modification to the second schedule from the user; and
means for scheduling the manufacturing activity according to the modified second schedule after receiving the modification.

26. The device of claim 22, wherein means for formulating the second schedule at least in part based on inventory information associated with at least one resource used in the manufacturing activity comprises:
means for determining whether to formulate an aggressive schedule or a conservative schedule; and
in response to determining to formulate the aggressive schedule, means for selecting second dates such that the aggressive schedule includes relatively short periods of time between the steps when compared to the conservative schedule.

27. The device of claim 22, wherein means for formulating the second schedule at least in part based on inventory infor mation associated with at least one resource used in the manufacturing activity comprises:

means for determining whether to formulate an aggressive schedule or a conservative schedule; and in response to determining to formulate the conservative schedule, means for selecting second dates such that the conservative schedule includes relatively long periods of time between the steps when compared to the aggressive schedule.

28. The device of claim 22, wherein the requested date, the first dates, the second dates, and the third dates indicate particular times of particular days.

* * * * *